(12) United States Patent (10) Patent No.: US 12,563,322 B2
Ord et al. (45) Date of Patent: Feb. 24, 2026

(54) METHOD FOR THE NETWORKED MONITORING OF AT LEAST ONE OBJECT

(71) Applicant: E.ON Digital Technology GmbH, Munich (DE)

(72) Inventors: Nicholas Ord, Munich (DE); Philipp Bugs, Munich (DE); Laura Antonia Färber, Munich (DE); Alexander Schlüter, Munich (DE); Karsten Wildberger, Munich (DE)

(73) Assignee: E.ON SE, Essen (DE)

( * ) Notice: Subject to any disclaimer, the term of this patent is extended or adjusted under 35 U.S.C. 154(b) by 344 days.

(21) Appl. No.: 18/017,223

(22) PCT Filed: Jul. 15, 2021

(86) PCT No.: PCT/EP2021/069864
§ 371 (c)(1),
(2) Date: Jan. 20, 2023

(87) PCT Pub. No.: WO2022/017932
PCT Pub. Date: Jan. 27, 2022

(65) Prior Publication Data
US 2023/0300498 A1 Sep. 21, 2023

(30) Foreign Application Priority Data
Jul. 20, 2020 (DE) .......................... 102020119067.0

(51) Int. Cl.
H04Q 9/00 (2006.01)
G06Q 10/20 (2023.01)
(Continued)

(52) U.S. Cl.
CPC .............. H04Q 9/00 (2013.01); G06Q 10/20 (2013.01); G16Y 20/10 (2020.01); G16Y 40/10 (2020.01); G16Y 40/20 (2020.01)

(58) Field of Classification Search
CPC .......... H04Q 9/00; G16Y 20/10; G16Y 40/10; G16Y 40/20; G06Q 10/20; G01H 17/00
See application file for complete search history.

(56) References Cited

U.S. PATENT DOCUMENTS 5,784,233 A * 7/1998 Bastard .................. H02H 7/045
361/93.6
6,238,338 B1 * 5/2001 DeLuca .................. A61B 5/681
128/903
(Continued)

FOREIGN PATENT DOCUMENTS

CN 110208022 A 6/2019
RU 2010137938 3/2012
WO WO 2018/109677 A1 6/2018

OTHER PUBLICATIONS

López-Fernández Xose M. et al.; "Transformers: Analysis, Design, and Measurement" CRC Press, p. ToC.Ch09,Ch12; Jun. 27, 2012; pp. 216-221 and pp. 291-293; ISBN: 978-1-4665-0824-8; XP055847203.

(Continued)

*Primary Examiner* — Brian J. Gillis
*Assistant Examiner* — Chhian (Amy) Ling
(74) *Attorney, Agent, or Firm* — Thorpe North & Western, LLP

(57) ABSTRACT
The invention relates to a method for networked monitoring of at least one object, wherein the following steps are performed:
acquiring (110) at least two different acquisition parameters (210) by a monitoring component (20) on at least one object (5), wherein the acquisition parameters (210) are specific to at least one object parameter of the object (5),
outputting (130) monitoring information (240) about the acquired acquisition parameters (210) to a network (70)
(Continued)

Figure 1:
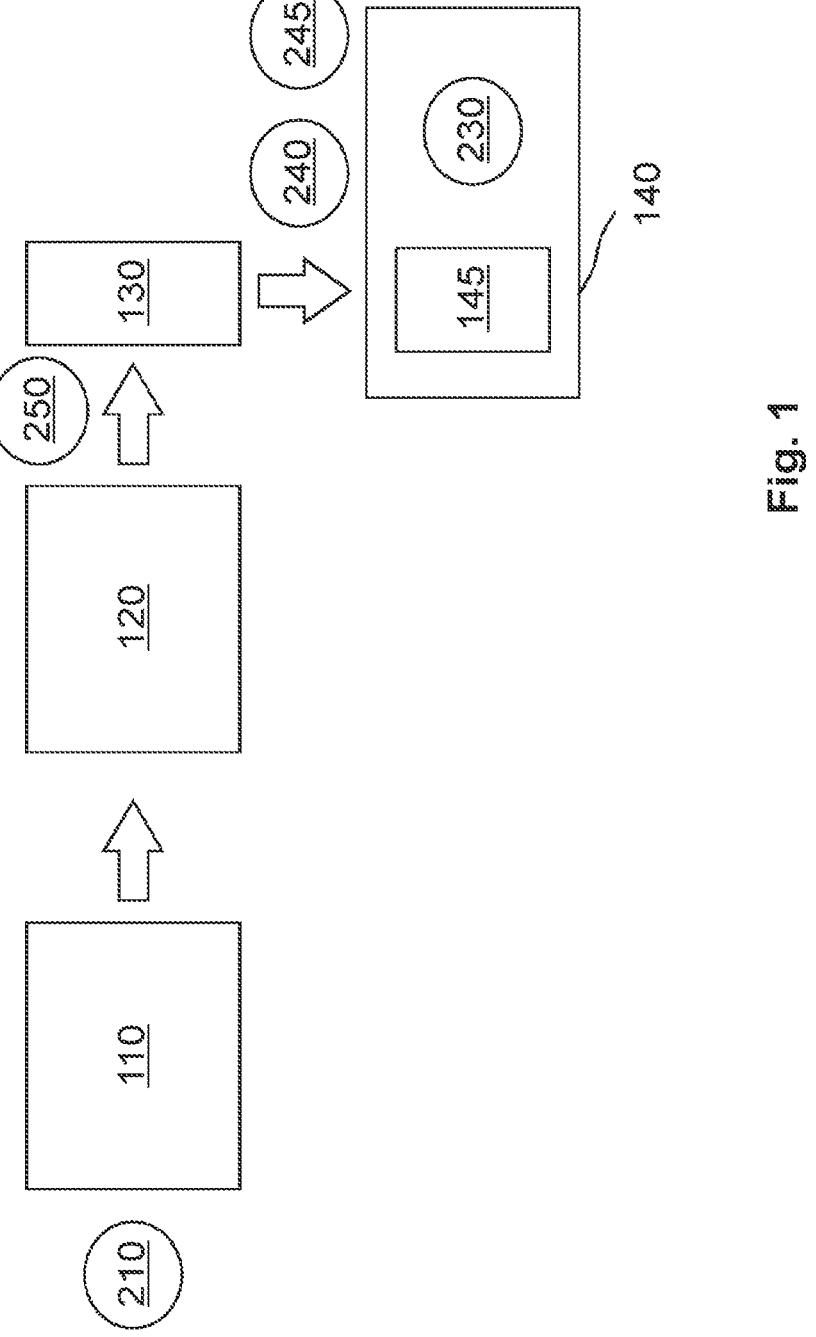

for transmission to a processing system (80) for evaluation (140) of the object parameter based on the monitoring information (240).

19 Claims, 3 Drawing Sheets

(51) Int. Cl.
G16Y 20/10 (2020.01)
G16Y 40/10 (2020.01)
G16Y 40/20 (2020.01)

(56) References Cited

U.S. PATENT DOCUMENTS

| | | | |
|---|---|---|---|
| 10,432,325 B1* | 10/2019 | Slamani | H04B 17/345 |
| 2004/0059205 A1 | 3/2004 | Carlson et al. | |
| 2010/0177202 A1* | 7/2010 | Sakaue | G04R 20/02 |
| | | | 368/10 |
| 2017/0227592 A1* | 8/2017 | Berler | G01R 31/62 |
| 2019/0197238 A1 | 6/2019 | Canedo et al. | |
| 2019/0289077 A1 | 9/2019 | Sacchetti | |
| 2025/0086243 A1* | 3/2025 | Kim | G06F 16/9537 |

OTHER PUBLICATIONS

Ahmed, Hosameldin et al; "Condition monitoring with vibration signals: compressive sampling and learning algorithms for rotating machines" Wiley, pp. ToC,Ch01,Ch04-Ch06,Ch09-Ch10,Ch14; Jan. 7, 2020; Chapters 4 & 6; pp. 4-10 ISBN: 978-1-119-54462-3; XP055847206.

* cited by examiner

METHOD FOR THE NETWORKED MONITORING OF AT LEAST ONE OBJECT

The present invention relates to a method for networked monitoring of at least one object. Furthermore, the invention relates to a monitoring component and a system for networked monitoring.

The growing world of the IoT (Internet of Things) requires that "things" (i.e., objects such as doors, windows, lighting fixtures, industrial or household machines, power grids, and transformers) be equipped with physical sensors. In addition, a wired or wireless connection must be provided that connects the objects from their location to the Internet. The purpose of the networking of the objects achieved in this way is to allow the objects to work together by interacting with each other.

However, the technical effort required for integrating sensors and networking is often enormous. One example are transformers of power supply plants, where extensive measures for sensor technology and networking are necessary. Any type of connection to a typical low-voltage transformer requires shutting down the transformer for several hours or days in order to safely physically connect sensing cables to monitor the transformer's performance. This results in interruption of service or temporary detour of power to the grid. Monitoring events such as overheating, power imbalance, grid load, or oil cooling system condition may involve a few days of downtime.

In principle, objects may require complex invasive measures for digital monitoring by means of sensors and networking (e.g., physical drilling into the object in order to attach sensors). This makes it difficult to network objects reliably and in a technically and economically sensible way, and for these reasons it is generally not possible, especially in the case of transformers.

It is therefore an object of the present invention to at least partially eliminate the disadvantages described above. In particular, it is an object of the present invention to provide an improved solution for monitoring at least one object.

The above object is solved by a method having the features of claim 1, by a monitoring component having the features of claim 14, and by a system having the features of claim 16. Further features and details of the invention result from the respective dependent claims, the description and the drawings. Features and details which are described in connection with the method according to the invention naturally also apply in connection with the monitoring component according to the invention as well as the system according to the invention and vice versa in each case, so that with regard to the disclosure concerning the individual aspects of the invention reference is or can always be made mutually.

The object is solved in particular by a method for networked monitoring of at least one object, in particular at least one transformer and/or power transformer and/or low-voltage transformer, which is preferably used in an energy supply power network (i.e. for voltage conversion in energy supply systems). The method according to the invention may further enable monitoring and networking of objects such as household appliances or machines or the like. Different objects may also be monitored (e.g., a transformer and an industrial machine). The respective monitored object may not originally have any sensor technology for monitoring and/or any components for networking and thus not be configured to be IoT-capable. Furthermore, the at least one object may in each case also be configured as a mechanical, non-electrical object such as a door or a window. Further possible embodiments of objects are described in more detail below.

In particular, it is envisaged that the following steps are carried out, preferably one after the other in the specified order, whereby individual and/or all of the steps can also be carried out repeatedly if necessary:

acquisition, preferably contactless and/or wireless measurement and/or reception, of at least two (or at least three or at least four or at least six or at least eight) different acquisition parameters by (exactly) one (single) monitoring component for at least or exactly one (in particular active, i.e. electrically operated without interruption of operation for monitoring, and/or passive and therefore not electrically operated) object, the different acquisition parameters preferably being specific for at least or exactly one object parameter of the object, optionally: performing a frequency evaluation, in particular a digital Fourier transform, on the basis of at least one of the acquired acquisition parameters by the monitoring component, outputting monitoring information about the acquired acquisition parameters and/or about a result of the frequency evaluation (e.g., a spectrum) to at least one network for transmission (of the monitoring information) to a processing system (such as a cloud) for evaluation, i.e., e.g., for value determination or other determination of the object parameter based on the monitoring information.

In other words, the processing system is used to evaluate the object parameter in order to provide monitoring through this evaluation. The processing system can be configured as a central processing system to receive monitoring information from different monitoring components and to evaluate the object parameters of different objects based on this information. It is also possible that several object parameters of different objects can be evaluated on the basis of one monitoring information.

For example, states and/or events and/or properties and/or operating parameters (such as an electrical power) and/or measurable anomalies of the object or in the environment of the object can be evaluated as object parameters. For example, the at least one object parameter may be measurable at the object in each case or correlates at least with a current state of the object. It may be provided that the object parameter directly relates to the current (or a future, predicted) state of the object or the event, or that a conclusion can be drawn about the current (or the future) state of the object and/or the event at the object by evaluating the object parameter. The respective acquisition parameter can be specific to the object parameter, e.g., be implemented as a measurable physical quantity (such as a temperature or light intensity or the like), which is dependent on or influenced by the object parameter. For example, an electrical power or a critical state of a transformer (as the object parameter) can be monitored on the basis of an electrical field and/or on the basis of a noise and/or on the basis of a vibration (each as one of the acquisition parameters).

The transmission of the monitoring information takes place via at least one network, so that the monitoring can be networked. Specifically, this can mean that several monitoring components are connected to the network, each of which outputs monitoring information for at least one or more objects to the network. The monitoring components may monitor different objects, if necessary. Also, each one of the monitoring components may monitor a plurality of different objects, respectively, and thus acquire an acquisition parameter that is generated and/or influenced by one or more of these objects. The monitoring may be non-invasive to the object due to the wireless or non-contact acquisition of the acquisition parameter with respect to the object.

The method according to the invention has the advantage that reliable monitoring of a single object and, if necessary, also monitoring of a large number of objects is possible in a technically simplified manner. Retrofitting an object for networked monitoring can also be made possible in a technically simple manner by using the monitoring component.

The at least one object may be formed as one of the following objects, respectively:

a door or a window, a transformer for a power grid, a machine, in particular a household appliance such as a washing machine or a dishwasher, lightning means, industrial machines such as industrial robots.

If more than one object is provided as the at least one object, the objects may also comprise at least two or at least four or at least ten different ones of these objects, for which the acquisition parameters may be acquired by a single monitoring component. It is conceivable that several similar acquisition parameters are then acquired (e.g. as an overlay), which correlate with object parameters of different objects. For example, a superposition of a vibration of a first object and a vibration of a second object can be acquired as an acquisition parameter, which thus enables conclusions to be drawn about object parameters of the different objects. If a monitoring component monitors several objects, it is possible to distinguish from which object the acquisition parameter was acquired on the basis of the monitoring information, e.g. on the basis of the magnitude of frequency signatures of the monitoring information. Also, if necessary, the superposition can be resolved again in this way, for example on the basis of an evaluation of the frequencies and/or the amplitude of the monitoring information. Exemplarily, the monitoring information comprises audio information of an acquired acoustic acquisition parameter. Then, in case of a lower volume, a larger distance of the object can be concluded.

The object may be configured as a transformer such as a low-voltage transformer, i.e. for transforming voltages in the range of 10 kV or 20 kV, especially in distribution nodes.

The at least one object parameter may comprise an electric current and/or a load and/or an electric power of the object and/or the like. Thus, the object parameter may be specific to the load and/or operation and/or state of the object. Thus, the monitoring may be directly implemented as a measurement of the object parameter or as a determination of the state of the object, in particular the load, by evaluating the object parameter. The state includes, for example, an overheating and/or a power imbalance and/or a network load and/or a state of oil cooling systems of the object and/or the like. Thus, by evaluating the object parameter, the state of the object can be determined.

It may further be possible that a frequency evaluation of at least one of the acquisition parameters is performed, in particular by the monitoring component, and the monitoring information then comprises at least information about a result of the frequency evaluation (such as a spectrum or a frequency signature). Furthermore, the frequency evaluation may be implemented as a Fourier transform, in particular a Fast Fourier transform (FFT). By means of the Fourier transform, the acquired acquisition parameter can be decomposed into its frequency components, i.e., in other words, a spectrum can be determined. This makes it possible to perform the evaluation of the object parameter on the basis of the frequency components. The result of the frequency evaluation can thus be a spectrum whose values are digitally represented by the monitoring information.

A further advantage can be that the monitoring component is structurally separate from the object and/or the processing system. The monitoring component can thus be used for monitoring even during ongoing operation of the object and without structural adaptation to the object for the installation of the monitoring component due to the separate configuration to the object. It can also be possible in this way for the monitoring component to monitor several objects. The separate configuration to the processing system makes it possible to use a central processing system, which can be connected to several monitoring components via the at least one network. The central processing system can thus evaluate and, in particular, determine the object parameter for different objects. In doing so, the monitoring information can have assignment information in order to assign the monitoring information to the monitoring component from which it was output.

It is possible that the acquisition parameters are implemented as at least two of the following parameters:

an electromagnetic field, which is generated in particular by the object during operation, a temperature, especially in the vicinity of the object, a gas, especially in the vicinity of the object, a print, light, especially luminous intensity, a moisture, especially in the environment of the object, temperature, heat, a vibration, a pyroelectric infrared-direction detection, electromagnetic interference, sound.

The acquisition can also be executed as a measurement for at least one of the acquisition parameters. The acquired or measured values for the acquisition parameters during acquisition and, in particular, the combination of these values for different acquisition parameters acquired at the same time can be dependent on the object parameter, e.g. an event and/or state of the object. For example, the event of opening a door, with the door as the object, can influence the acquisition parameters used in a reproducible way. This makes it possible to detect such influences by certain values or patterns or anomalies in the monitoring information. Advantageously, the monitoring information comprises the combination of values, and can also be evaluated in a time-dependent manner (e.g., based on the time course), if necessary. Also, the temporal correlation of the occurrence of this influence in the different acquisition parameters may be specific to the object parameter. Therefore, it may be useful to synchronize the acquisition and/or the output monitoring information in time.

According to a further advantage, it can be provided that at least one of the acquisition parameters is generated in the form of an electromagnetic field and/or electromagnetic waves by the (at least one) object during operation (i.e., in an operationally active state), wherein preferably the monitoring component is spatially arranged at the object and/or at a distance from the object within reception range of the acquisition parameter. Accordingly, the acquisition parameter can be implemented as an electromagnetic signal which is generated by only one object, or can also be implemented as a superposition of the fields or waves which are generated by several objects.

For example, a distance between the monitoring component and the object may be at least one meter, or at least two meters, or at most two to three meters.

Furthermore, it is optionally possible within the scope of the invention that at least one of the acquisition parameters is implemented as an electromagnetic signal, in particular a low-frequency signal, preferably in the frequency range from 40 Hz to 70 Hz and/or with a frequency of substantially 50 Hz or 60 Hz. In this case, the frequency of the signal can correspond to the network frequency of a power network in which the object is used as a transformer.

It is further advantageous in a method according to the invention if the at least one object parameter is implemented as at least one of the following parameters:

an event such as a physical event at the object, preferably a movement at the object and/or an electrical activation of the object and/or a door opening and/or door closing and/or a transition to another state of the object, in particular to a critical state, an electrical parameter, in particular an electrical current of the object or an electrical power, in particular to perform the processing for current measurement at the object and/or to acquire a load profile of the object, a state of the object, especially a critical state, a change in a magnetic or electric field at the object, a noise development of the object, a vibration state of the object.

A change in the object parameter can result in at least one of the acquisition parameters being influenced. This makes it possible to draw conclusions about the object parameter based on the acquisition of the acquisition parameters.

In order to be able to evaluate the acquisition centrally for various monitoring components, advantageously at least one piece of information about the acquisition will be transmitted to the processing system by means of the monitoring information. Depending on the evaluation of the object parameter, an indication to a user of the processing system, such as a warning, can then be issued. The monitoring information may have as the information the acquired values for all acquired acquisition parameters.

It may be further possible that the following steps are performed to evaluate and, in particular, determine the at least one object parameter:

receiving the output monitoring information by the processing system, preferably through an electronic network interface of the processing system, carrying out processing (preferably by the processing system), in particular in the form of a digital evaluation, of the received monitoring information, preferably by an evaluation means/element (in particular of the processing system), in particular in order to use a result of the processing as information about the object parameter.

The processing can be performed, for example, by statistical algorithms and/or by a detection of peaks and/or maxima in the monitoring information. Also, a centroid determination and/or pattern recognition or the like may be performed on the monitoring information for processing. Accordingly, the evaluation means/element may be configured as a computer program or the like to perform this processing. The object parameter information is implemented, for example, as a value determination of the object parameter, e.g., an electrical output current of the object, or as an assignment to a state of the object.

The monitoring information comprises, for example, a spectrum of at least one of the acquired acquisition parameters, which is the result of the frequency evaluation. Exceeding predefined threshold values of the amplitudes of certain frequency components and/or a certain frequency pattern can provide conclusions about the object parameter. Accordingly, according to a further possibility, a possibly empirically determined assignment of certain predefined spectra to certain object parameters or states can also be provided. Based on this assignment, the spectrum of the monitoring information can then be assigned to the corresponding object parameter or state and thus the monitoring can be performed in a simple manner. The assigned object parameter or state is then the result of the evaluation. If the assignment is made to a critical object parameter or state, which indicates, for example, an overload of the object, a warning message can advantageously be issued to a user. The evaluation means/element comprises, for example, a predefined table for this assignment.

In a further possibility, it can be provided that the evaluation means/element has at least one artificial neural network to perform the processing, in particular evaluation, according to machine learning on the basis of a learned information of the evaluation means/element. A neural network makes it possible, instead of an empirical manual assignment of the monitoring information to an object parameter or state, to obtain this assignment automatically by training. For this purpose, training data can be used, for example, in the form that input data comprise predetermined monitoring information which is assigned to predefined object parameters or states of the object as ground truth. Through training, the learned information can be obtained, for example, in the form of neuron weighting of the neural network.

In a further possibility, it may be provided that the following steps are performed, in particular before and/or during and/or after dispensing:

acquiring a time information about a time of acquiring the acquisition parameters by the monitoring component, assign the time information to the monitoring information to output the monitoring information with the assigned time information, carrying out the processing, in particular evaluation (of the received monitoring information by the evaluation means/element and/or the processing system) on the basis of the time information, the received monitoring information preferably being sorted in time on the basis of the associated time information.

The time information is, for example, in the form of a time stamp for the monitoring information. It may be an objective to generate the monitoring information in the form of "database-ready" structured data with ordered time stamps for large data sets. The monitoring component may have at least one evaluation component comprising at least one DPU (data processing unit). The data from the evaluation component may have accurate data stamps, but may not arrive at the processing system in a time-ordered sequence, since, for example, millions of pieces of data may arrive from thousands of DPUs across multiple networks, each with its own latencies—a timestamp may arrive fractions of a second later, even though the event itself occurred earlier in real time. The advantage is that this "unstructured data" is technically far easier to operate than classic database-structured data, where everything is time-ordered but technically complex.

By using the time information, it is also possible that during processing, in particular evaluation (of the received monitoring information by the evaluation means/element and/or the processing system), several monitoring information items following one another in time are processed. For example, a temporal progression and, in particular, a temporal pattern in this monitoring information can be evaluated in order to detect an anomaly that indicates a critical state of the object.

A further advantage can be achieved within the scope of the invention if the frequency evaluation is carried out for frequencies at least in the range from 10 Hz to 100 Hz, preferably in the range from 40 Hz to 70 Hz, preferably in order to carry out the evaluation of the object parameter also on the basis of frequency components in this range. Thereby, the frequencies used for the frequency evaluation can correlate with the network frequency of a power system in which the object is used in the form of a transformer. In particular, the frequency evaluation for frequencies above 1 kHz or above 100 Hz can be omitted.

It is optionally provided that the monitoring information comprises at least one information about the respective acquired acquisition parameter, wherein preferably during the processing of this information in particular a temporal course of the information is compared with the time information in order to obtain the result. The comparison of the information can be performed, for example, by detecting a predetermined correlation and/or combination of values at the same point in time. For example, pattern recognition, a learned neural network or a predefined pattern may be used for this purpose. For example, predefined rules can be used for which combination of values of the acquisition parameters which result is obtained. The result is e.g. a state of the object. The information is e.g. acquired values of the acquisition parameter.

It may be provided that during the evaluation of the object parameter, a temporal correlation is searched for in one or different monitoring information. For example, a particular event at the object such as the opening of a door generates a unique combination of values of the information about different acquisition parameters at the monitoring information. In this way, when using an audio and vibration parameter as an acquisition parameter, any event that has both an audio and vibration characteristic can be distinguished from other events by an audio signature at the monitoring information and its relative location (via audio amplitude) and proximity to vibration. This also allows multiple objects (e.g., ten objects) to be monitored by a single monitoring component. Thus, ten conventional sensors for each object can be replaced by one monitoring component.

The time it takes for such complex information to be transmitted over the network and processed in real time can be very long or require a great deal of data bandwidth. Similarly, such data may need to be synchronized—a single occurrence of a pattern in the information about one acquisition parameter (e.g., vibration) may be meaningless if it is not accompanied simultaneously by a corresponding pattern in the information about another acquisition parameter (e.g., in the audio or electromagnetic spectrum). Therefore, an atomically accurate central clock may optionally be used to synchronize the monitoring component and/or other monitoring components and/or the processing system. The central clock may be used, for example, to synchronize the monitoring information and/or to determine the time information.

It is provided, according to another possibility, that the monitoring information has a frequency signature of at least one of the acquired acquisition parameters. This allows the magnitude of these frequency signatures to be distinguished from near and far, in such a way that the actual location can be determined for fixed, non-moving objects such as doors or machines. This has the advantage that, in many cases, sensors no longer need to be attached to the objects. Instead, one or two groups of sensors in just two devices (properly positioned) can learn and map an entire range of events within a short time.

It may further be possible that at least the execution of the frequency evaluation and/or the evaluation of the object parameter is carried out in real time. A time synchronization of the acquisition and/or the evaluation of the monitoring information can also be provided, e.g. by means of time information.

According to an advantageous further development of the invention, it may be provided that a state of the object is monitored by the method according to the invention during operation. The object can be used as a transformer, e.g. actively for voltage transformation, while the monitoring is carried out. This can provide a significant advantage over invasive monitoring methods, in which the object must be switched off at least temporarily.

If more objects than the at least one object are monitored, it is further possible that the acquisition of the at least two different acquisition parameters is carried out by the (in particular single) monitoring component at the objects at a common location. In this case, an assignment of the acquisition parameters to the objects can be carried out on the basis of the monitoring information, for example by the processing system. For this purpose, it may be provided that an appropriately high resolution is selected for the acquisition in order to be able to perform this differentiation of the objects for the assignment on the basis of the monitoring information. For example, the monitoring information has information about the acquired values of the acquisition parameters, so that a temporal progression of these values can be evaluated in the case of rapid successive acquisition. Such fine-grained acquisition can enable discrimination when patterns and/or anomalies and/or the like occur over time. For example, if the objects monitored by the monitoring component, two doors and a machine, generate multiple vibrations, sounds, and electromagnetic waves in the same time slot of, say, 3 seconds, the way to distinguish between discrete events is to slice the acquired acquisition parameters in slow motion, like a high-speed camera, and show precisely and synchronously how these events evolve in fractions of a second.

Furthermore, it is conceivable that the (at least one) network is at least partially implemented as the Internet, i.e. comprises the Internet. Also, the network may comprise a mobile network or at least one local area network (e.g., a LAN, i.e., a Local Area Network). A plurality of different monitoring components may be in data communication with a (single) processing system via the at least one network to perform monitoring for the respective objects.

Also an object of the invention is a monitoring component for networked monitoring of at least one object, comprising:

an acquisition component for acquiring at least two different acquisition parameters for at least one (in particular active and/or passive) object, wherein preferably the acquisition parameters are specific for at least or exactly one object parameter of the object, (optionally: an evaluation component for performing a frequency evaluation on the basis of at least one of the acquired acquisition parameters)

an output component for outputting monitoring information about the acquired acquisition parameters (and/or about a result of the frequency evaluation performed) to at least one network for transmission to a processing system, in particular a central processing system, for evaluation and, in particular, value determination of the object parameter on the basis of the monitoring information.

Thus, the monitoring component according to the invention provides the same advantages as have been described in detail with reference to a method according to the invention. In addition, the monitoring component may be suitable for carrying out a method according to the invention.

Furthermore, it is advantageous if the acquisition component has a receiving antenna which is configured to acquire the acquisition parameter as an electromagnetic and in particular low-frequency signal, in particular in the range from 40 Hz to 70 Hz. It may also be provided that the acquisition component comprises at least one sensor for acquiring the respective acquisition parameter. Alternatively or additionally, the evaluation component may comprise at least one data processing unit for performing the frequency evaluation in the form of digital data processing. The output component may in particular be configured as a network interface and/or as a wireless (i.e. radio) interface. The acquisition component and/or the evaluation component may be arranged in a common housing and, in particular, may form a common component. A common printed circuit board for the components may also be provided, which is arranged in the housing.

Also an object of the invention is a system for networked monitoring of at least one object, comprising:

a monitoring component according to the invention, the processing system to evaluate the object parameter based on the monitoring information.

Thus, the system according to the invention provides the same advantages as have been described in detail with reference to a method according to the invention and/or a monitoring component according to the invention.

Advantageously, the method according to the invention and/or the monitoring component according to the invention can enable the detection of multiple (IoT-)physical events at multiple locations simultaneously without requiring physical contact with the object. Accordingly, the monitoring component and the object may be physically spaced apart and/or arranged for monitoring.

The at least one further acquisition parameter may further comprise at least one of the following: Vibration, audio noise, humidity, light, infrared, $CO_2$ (carbon dioxide), volatile organic compounds (VOCs) or total volatile organic compounds (TVOCs). Acquisition can also be performed, for example, by the acquisition component, but possibly also with other environmental sensors. It is possible that the monitoring component has at least one sensor to acquire the acquisition parameters. The monitoring information can be formed from the acquired acquisition parameters, so that the monitoring information is an information about this acquisition parameter (e.g., represents this acquisition parameter in terms of values). For example, in the case of acquiring an audio sound as an acquisition parameter, the monitoring information may comprise a value-based audio recording of the audio sound.

The monitoring component, and in particular the acquisition component, may comprise at least one sensor, and preferably comprise at least one of the following sensors, to acquire an acquisition parameter:

an audio sensor to acquire an airborne sound as an acquisition parameter, wherein preferably the acquisition parameter acquired by the audio sensor can be specific to an on or off switching of mechanical circuit breakers on the object, so that preferably the state of the object in the form of a partial discharge of the object can be determined based on the monitoring information, a light sensor, wherein light or a light intensity can be specific as an acquisition parameter for opening a door and/or for a time of day, so that the opening of the door as an event or the time of day can preferably be determined on the basis of the monitoring information, an infrared sensor to acquire heating as an acquisition parameter, so that a temperature on the object can preferably be determined based on the monitoring information, a $CO_2$ sensor, especially to determine a presence of people based on the monitoring information, a TVOC sensor, especially to determine an oil leak based on the monitoring information, a pressure sensor, in particular to perform weather forecasting based on the monitoring information and possibly in combination with the use of a humidity sensor and/or temperature sensor.

It is also optionally provided that the processing system evaluates and/or determines the object parameter or further information by processing the monitoring information of different monitoring components with each other. In this way, it may be possible, for example, to evaluate a virus transmission through the air in a building as an object parameter by acquiring the acquisition parameters. For this purpose, for example, different monitoring components can be arranged at different heights in order to determine an internal weather system or climate in the building. Acquisition parameters acquired for this purpose are, for example, an air humidity or temperature or the like.

It may be provided for installation that the raw monitoring information is first displayed to an installer so that the installer can see in real time how the monitoring component, and in particular the acquisition component, is positioned and calibrated in the field. Positioning and placement can be critical to obtaining clear and reliable data from the acquisition component (i.e., a physical sensor).

Figure 2:
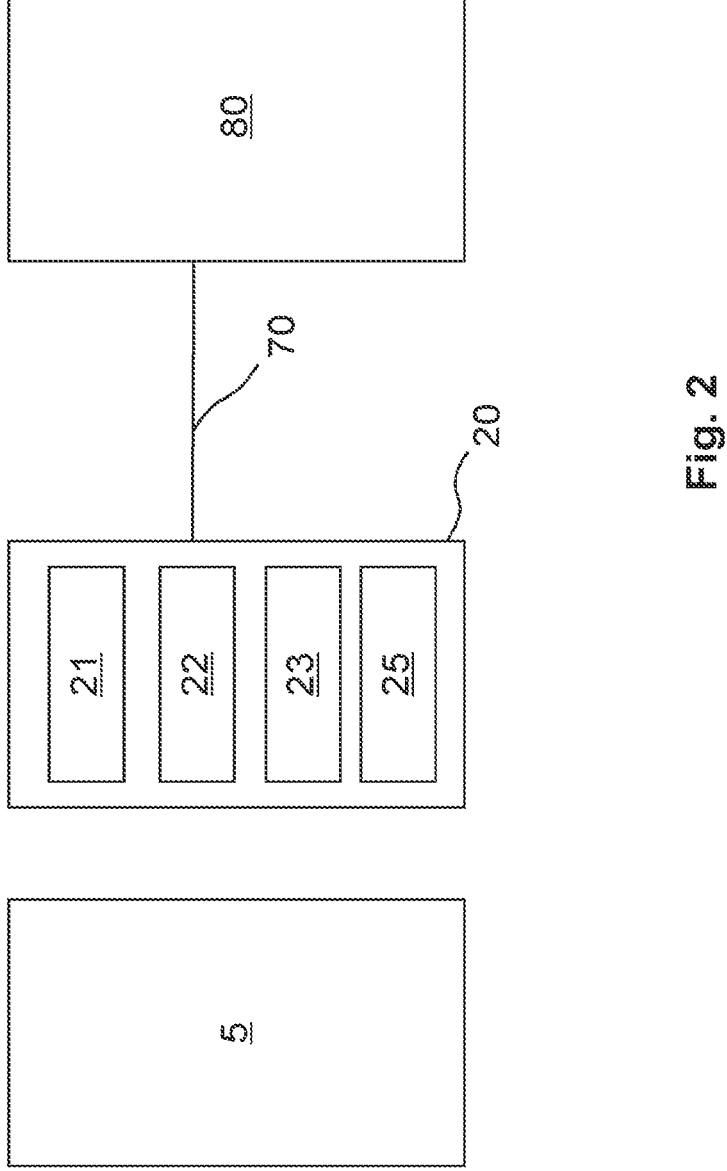
Figure 3:
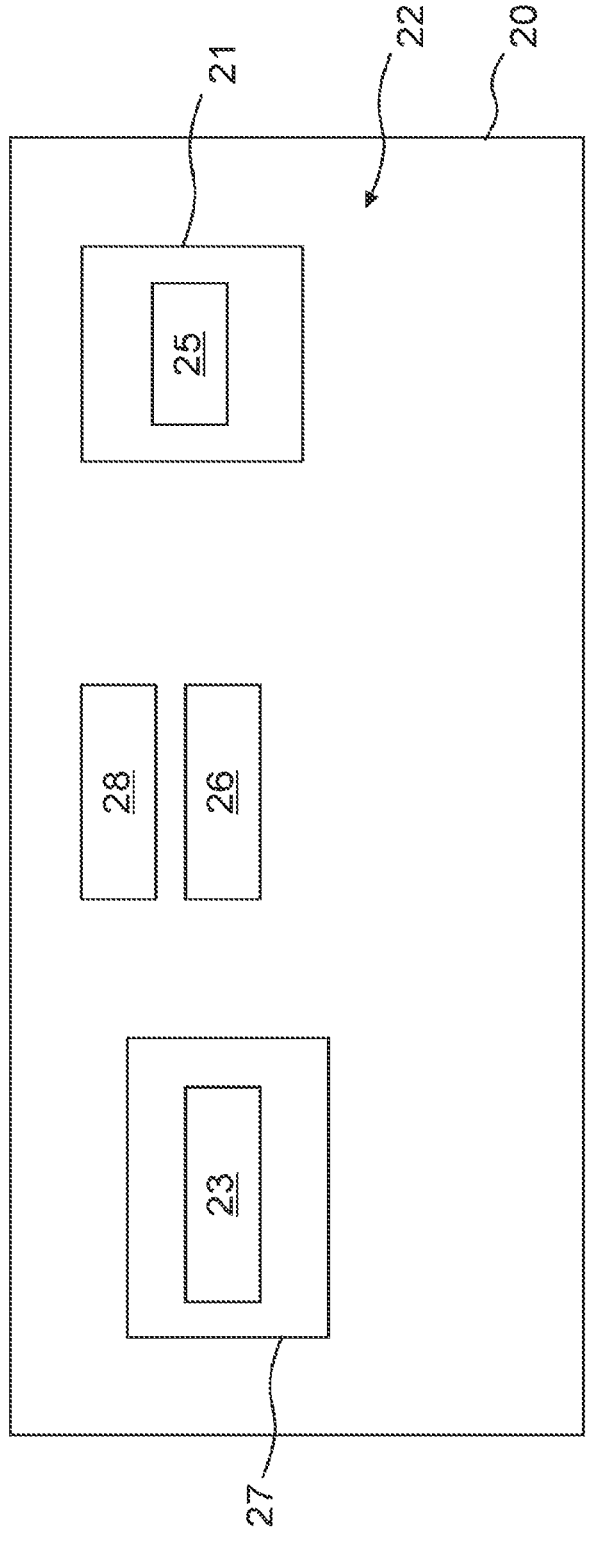

Further advantages, features and details of the invention will be apparent from the following description, in which embodiments of the invention are described in detail with reference to the drawings. In this connection, the features mentioned in the claims and in the description may each be essential to the invention individually or in any combination. Showing:

FIG. 1 schematic diagram for visualizing process steps,

FIG. 2 schematic representation of parts of a system according to the invention and a monitoring component according to the invention, FIG. 3 schematic representation of parts of a monitoring component according to the invention.

In the following figures, the identical reference signs are used for the same technical features even of different embodiment examples.

FIG. 1 schematically visualizes a method according to the invention for networked monitoring of at least one object 5. According to a first method step, at least two different acquisition parameters 210 are acquired 110 by a monitoring component 20 at at least one object 5. The object 5 can be active during the acquisition 110 and thus, for example, generate and/or influence the acquisition parameter 210 during operation. Accordingly, the acquisition parameter 210 is specific to at least one object parameter of the object 5. Subsequently, according to a second method step, an optional frequency evaluation 120 can be performed by the monitoring component 20 on the basis of at least one of the acquired acquisition parameters 210. Specifically, a Fast Fourier transform may be used for this purpose so that the frequency evaluation 120 can be performed by the monitoring component 20 even with low computing power. For example, the monitoring component 20 comprises at least one microcontroller to perform the frequency evaluation 120. Subsequently, monitoring information 240 about the acquired acquisition parameters 210 and/or about a result of the frequency evaluation 120 may be output to a network 70 at step 130 to transmit the monitoring information 240 to a processing system 80. The processing system 80 may be for evaluating 140 the object parameter based on the monitoring information 240. For example, the monitoring information 240 may be in the form of a data set having data with the measured values determined during the acquisition 110 and/or values from a processing of the measured values.

Further, the following steps may be performed to perform the evaluation 140 of the at least one object parameter. According to a first step in the evaluation 140, the output monitoring information 240 may be received by the processing system 80. According to a second step in the evaluation 140, a processing 145 of the received monitoring information 240 may be performed by an evaluation means/element 230 to use a result of the processing 145 as information about the object parameter.

Further, it is possible for a time information 245 about a time of acquisition 110 of the acquisition parameter 210 by the monitoring component 20 to be acquired. This time information 245 may be associated with the monitoring information 240 to output the monitoring information 240 with the associated time information 245 at step 130. Processing 145 may then be performed based on the time information 245, preferably time sorting the received monitoring information 240 based on the associated time information 245.

FIG. 2 schematically shows parts of a monitoring component 20 according to the invention for networked monitoring of at least one object. An acquisition component 21 may serve to acquire 110 at least two different acquisition parameters 210 at the object 5, wherein the acquisition parameters 210 are specific for at least one object parameter of the object 5. The acquisition component 21 may include a receiving antenna 21 and/or at least one sensor 25 to acquire the acquisition parameters 210. At least one of the acquisition parameters 210 may be in the range of 0 Hz to 4 kHz (e.g., for audio) and/or in the range of 0 Hz to 400 Hz (e.g., for vibrations) and/or may also be a low frequency signal, in particular in the range of 40 Hz to 70 Hz. Further, an evaluation component 22 may optionally be provided for performing a frequency evaluation 120 based on the acquired acquisition parameter 210. An output component 23 may enable output 130 of monitoring information 240 about the acquired acquisition parameter 210, and in particular about a result of the frequency evaluation 120, to a network 70 to perform transmission of the monitoring information 240 to a processing system 80.

Also shown schematically in FIG. 2 is a system according to the invention for networked monitoring of at least one object, comprising a monitoring component 20 according to the invention and a processing system 80 for evaluating 140 the object parameter based on the monitoring information 240. The processing system 80 comprises, for example, at least one server to form a cloud for processing 145. Accordingly, the network 70 may be implemented at least in part as the Internet.

FIG. 3 shows a monitoring component 20 with further details. The monitoring component 20 and/or the at least one evaluation component 22 or DPU 22 of the monitoring component 20 may each have at least four main sections. In a first main section, a group of one to ten sensors 25 of the acquisition component 21 and/or associated interfaces may be provided. In a second main section, a data processing section 26 may perform frequency evaluation 120 and/or further processing. For this purpose, the data processing section 26 may comprise at least one microcontroller and/or integrated circuit. Further, a communication section 27 may be provided as a third main section. The communication section 27 may optionally include a wireless local area network (WLAN) interface and/or a long term evolution (LTE) interface as a data interface to the network 70. The uplink bandwidth for output to the network 70 may be, for example, 150 kbps. The communication section 27 may have the output component 23, which may have a corresponding antenna for output via a radio interface, in particular a 2.4 GHz radio interface. A fourth main section is formed, for example, by a central clock system 28 that synchronizes the data from the sensors 25 (also with other DPUs) by connecting it to a common atomic clock reference, with which the cloud may also be synchronized. Preferably, the main sections are attached to a common printed circuit board (PCB) so that the monitoring component 20 can form a compact component. In this way, the monitoring component 20 can also be configured to be movable independently of the object 5 and, in particular, to be portable by a person.

It is possible that the sensors 25 are connected to the data processing section 26 or the microcontroller, for example, via standard I²C digital interfaces or via analog-to-digital converters or digital audio interfaces. The sensors 25 are configured, for example, to acquire at least one of the following acquisition parameters: Gas, pressure, light, humidity, temperature, thermal image (grid eye), vibration (accelerometer), pyroelectric infrared-direction detection, electromagnetic interference (EMI), and audio.

The acquired acquisition parameter 210 and/or the other acquired acquisition parameters of EMI and/or audio and vibration can be further processed in parallel on the evaluation component 22 and in particular the microcontroller with the FFTs (Fast Fourier transforms) at the same time, if necessary, to achieve an optimal data output of, for example, 1.3 kb per second. This is a very dense data rate that allows accurate frequency and magnitude data of local events to be transmitted to the processing system in real time.

It has been found that it is advantageous if the frequency evaluation 120 is performed at the local chip level, i.e., by the evaluation component 22, thus by the monitoring component 20 locally at the object 5 and not remotely therefrom by the processing system 80.

The reliability of the monitoring and, in particular, the evaluation 140 of the object parameter based on the monitoring information 240 is particularly reliable if multiple acquisition parameters are acquired by multiple sensors 25. The monitoring information 240 may then have at least one piece of information about these acquired acquisition parameters. This information may be analyzed by the processing system 80 to determine a state of the object 5. In addition to using EMI and audio as possible acquisition parameters (an object 5 makes a low frequency "humming" noise), the use of a vibration in the environment of the object 5 may optionally be considered. Mechanical vibration, which travels slower through surfaces than electromagnetic waves or audio noise through the air, can then be acquired as an acquisition parameter. Since humidity and temperature may also correlate with the state of the object and the object parameter, respectively, it may also be possible to acquire these acquisition parameters. These then correlate to form complex data that moves exactly in sync with time and can accurately describe the energy load (EMI) that correlates with the state of the object 5.

The foregoing explanation of the embodiments describes the present invention exclusively in the context of examples. Of course, individual features of the embodiments may be freely combined with one another, provided that this is technically expedient, without departing from the scope of the present invention.

LIST OF REFERENCE SIGNS

5 Object
20 Monitoring component
21 Acquisition component
22 Evaluation component
23 Output component
25 Sensors
26 Data processing section
27 Communication section
28 Clock system
70 Network
80 Processing system
110 Acquisition
120 Local processing, frequency evaluation, Fourier transform
130 Output
140 Evaluation
145 Processing
210 Acquisition parameters
230 Evaluation means/elements
240 Monitoring information
245 Time information
250 Frequency components, spectrum

The invention claimed is:

1. A method for networked monitoring of a plurality of objects, wherein the following is performed:
   acquiring at least two different acquisition parameters by a monitoring component at the plurality of objects, wherein the acquisition parameters are specific to at least one object parameter of the object,
   outputting monitoring information about the acquired acquisition parameters to a network for transmission to a processing system for evaluation of the object parameter based on the monitoring information, wherein the acquisition of the at least two different acquisition parameters by the monitoring component is carried out for the plurality of objects at a common location without contact with the object, wherein an assignment of the acquisition parameters to the objects is carried out on the basis of the monitoring information.

2. The method according to claim 1, wherein a frequency evaluation of at least one of the acquisition parameters is carried out by the monitoring component, the monitoring information having information about a result of the frequency evaluation, the frequency evaluation being configured as a Fourier transform, by means of which the acquired acquisition parameter is decomposed into its frequency components in order to carry out the evaluation of the object parameter on the basis of the frequency components.

3. The method according to claim 2, wherein the frequency evaluation being configured as a Fast Fourier transform.

4. The method according to claim 1, wherein the monitoring component is structurally separate from the object and the processing system.

5. The method according to claim 1, wherein the acquisition parameters are implemented as at least two of the following parameters:
   an electromagnetic field which is generated during operation,
   a temperature,
   a gas,
   a pressure,
   light,
   humidity,
   heat,
   vibration,
   pyroelectric infrared-direction detection,
   electromagnetic interference,
   sound.

6. The method according to claim 1, wherein the at least one object parameter is implemented as at least one of the following parameters:
   a physical event at the object,
   an electrical parameter,
   a state of the object,
   a change of a magnetic or electric field at the object,
   a noise development of the object,
   a vibration state of the object.

7. The method according to claim 6, wherein the physical event at the object is at least a movement at the object or an electrical activation of the object or a door opening or door closing or a transition into another state of the object.

8. The method according to claim 1, wherein the following is performed to evaluate the at least one object parameter:
   receiving the output monitoring information by the processing system,
   performing processing of the received monitoring information by an evaluation element to use a result of the processing as information about the object parameter.

9. The method according to claim 8, wherein the evaluation element has at least one neural network for carrying out the processing in accordance with machine learning on the basis of a learned information of the evaluation element.

10. The method according to claim 8, wherein of the object parameters is executed as one of the following parameters:
   an electrical parameter of the object to perform the processing at least for measuring current at the object or for acquiring a load profile of the object,
   an event.

11. The method according to claim 8, wherein the following is carried out at least before or during or after the output:
   acquiring a time information about a time of acquisition of the acquisition parameters by the monitoring component,
   associating the time information with the monitoring information to output the monitoring information with the associated time information,
   performing the processing based on the time information.

12. The method according to claim 11, wherein the processing is based on sorting the received monitoring information in time based on the associated time information.

13. The method according to claim 8, wherein the monitoring information has at least one item of information about the respective acquired acquisition parameter, with the processing comparing this information with one another in order to obtain the result.

14. The method according to claim 13, wherein the information is a time profile of the information on the basis of the time information.

15. The method according to claim 1, wherein at least the acquisition or evaluation of the object parameter are carried out in real time.

16. The method according to claim 1, wherein the network is at least partially implemented as the Internet.

17. A monitoring component for networked monitoring of a plurality of objects, comprising:

an acquisition component for acquiring at least two different acquisition parameters in the plurality of objects, wherein the acquisition parameters are specific for at least one object parameter of the object, wherein the acquisition component comprises at least one sensor; and an output component for outputting monitoring information about the acquired acquisition parameter without contact with the object to a network for transmission to a processing system for evaluation of the object parameter based on the monitoring information, wherein the output component is a network interface or a wireless interface.

18. A system for networked monitoring of a plurality of objects, comprising:

a monitoring component according to claim 17, the processing system for evaluating the object parameter based on the monitoring information, wherein the processing system comprises at least one server to form a cloud for processing.

19. A method for networked monitoring of a plurality of objects, wherein the following is performed:

acquiring at least two different acquisition parameters by a monitoring component at the plurality of objects, wherein the acquisition parameters are specific to at least one object parameter of the object, outputting monitoring information about the acquired acquisition parameters to a network for transmission to a processing system for evaluation of the object parameter based on the monitoring information, wherein the at least one object parameter is implemented as at least a physical event at the object without contact with the object, wherein the physical event at the object is at least an electrical activation of the object.

* * * * *